INVENTORS.
Donald C. Perkins, &
BY Leonard P. Silk

E. J. Biskup
ATTORNEY

INVENTORS.
Donald C. Perkins, &
BY Leonard P. Silk

E. F. Biskup
ATTORNEY

United States Patent Office 3,552,795
Patented Jan. 5, 1971

3,552,795
ENERGY ABSORBING SEAT SUPPORT
Donald C. Perkins, Lansing, and Leonard P. Silk, East Lansing, Mich., assignors to General Motors Corporation, Detroit, Mich., a corporation of Delaware
Filed Oct. 23, 1968, Ser. No. 769,821
Int. Cl. B60r 21/10
U.S. Cl. 297—216                                    1 Claim

ABSTRACT OF THE DISCLOSURE

An energy absorbing support assembly for supporting a vehicle seating unit on a vehicle floor. The energy absorbing support includes a pair of parallel and laterally spaced channel members, each of which accommodates a pair of longitudinally spaced rollers carried along a lower side edge of the seating unit. Each roller has a diameter greater than the vertical distance between inner bearing surfaces of the channel member and is located in a well which serves to hold the roller from movement relative to the associated channel member except when excessively large forwardly or rearwardly directed inertial forces act on the seating unit at which time the rollers deform the bearing surfaces in the channel member.

---

The present invention concerns a seat support and more particularly a seat support incorporating energy absorbing means which permit the seat to move a limited extent relative to the floor. In the preferred form, the seat support includes a pair of parallel and laterally spaced channel members secured to the vehicle floor and extending longitudinally of the vehicle. Each of the channel members are located along one side of a vehicle seating unit and are formed with parallel and vertically spaced upper and lower bearing surfaces. A pair of longitudinally spaced rollers are mounted to the seat cushion portion of the seating unit along each lower side edge thereof with their axes of rotation extending transversely to the longitudinal axis of the vehicle. The rollers engage the opposed bearing surfaces and each roller has an outer diameter greater than the vertical distance between the bearing surfaces. In order to prevent relative movement of each roller relative to the channel member, the opposed bearing surfaces are formed with wells or depressions into which diametrically opposed points of the roller are located. The arrangement is such that under conditions when the seating unit may be subjected to excessive forwardly or rearwardly directed inertial forces, the rollers are adapted to move relative to the channel member along the longitudinal axis thereof to deform the opposed bearing surfaces and thereby serve as an energy absorbing means.

The objects of the present invention are to provide an energy absorbing seat support system mountable within a vehicle passenger compartment for holding a seating unit under normal conditions and providing metal deformation for absorbing inertial forces under conditions when the vehicle is subjected to excessive acceleration or deceleration forces; to provide a support assembly for supporting a seating unit on a vehicle floor that includes rollers which are normally fixed within channel members except under conditions when excessive forwardly or rearwardly directed inertial forces act on the seating unit at which time such forces are dissipated by deforming the channel members and permitting the seat to move a limited extent in the direction that the forces are acting; to provide a vehicle seat mounted on an energy absorbing system which takes the form of a track which under certain conditions causes the forward or rear end of the seat to move along an arcuate path while simultaneously dissipating energy; and to provide a seat mounted on a seat adjuster which in turn is connected with an energy absorbing system attached to the vehicle floor.

These and other objects and advantages of the present invention will be more apparent from the following detailed description when taken with the drawings in which.

Figure 1:
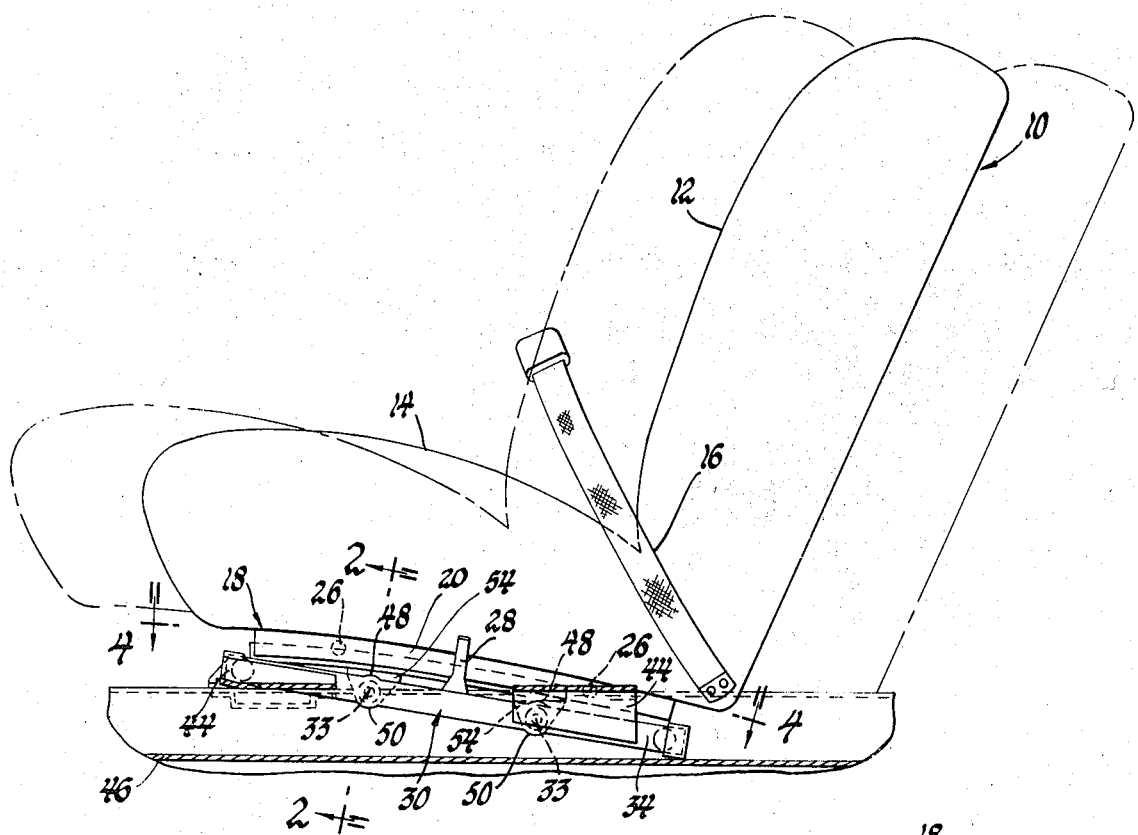
FIG. 1 is an elevational view showing a vehicle seating unit supported by an energy absorbing support assembly made in accordance with the invention.

Referring to the drawings and more particularly FIG. 1 thereof, a seating unit 10 is shown comprising the usual upstanding seat back 12 connected with a seating cushion 14. The seating unit 10 is located within the passenger compartment of a vehicle and has the lower end of a seat belt 16 anchored to the seating unit structure, while the upper end is intended to cross over the lap portion of a seat occupant in the usual manner and be buckled to another part of the seat belt located on the opposite side of the seating unit 10.

At this juncture, it will be noted that only one side of the seating unit 10 is shown and, accordingly, it will be understood that the other side thereof is provided with structure similar to the type which is to be described now.

The lower end of the seating cushion 14 is mounted on a track assembly 18 comprising upper and lower channel members or sections 20 and 22, respectively, which are relatively slidable and extend longitudinally of the vehicle. As is conventional, the channel members 20 and 22 are interlocked and spaced from each other by ball bearings 24 and roller bearings 26 which permit substantially frictionless movement of the upper channel member 20 relative to the lower channel member 22. A lever 28 is pivotally mounted to the track assembly 18 and includes a locking member (not shown) for locking the channel members 20 and 22 from relative movement. Track assemblies of this form are well known to those skilled in the art and, therefore, it is not deemed necessary to disclose any further details than those shown in order to understand how this device provides fore and aft adjustable movement of the seating unit 10.

Figure 2:
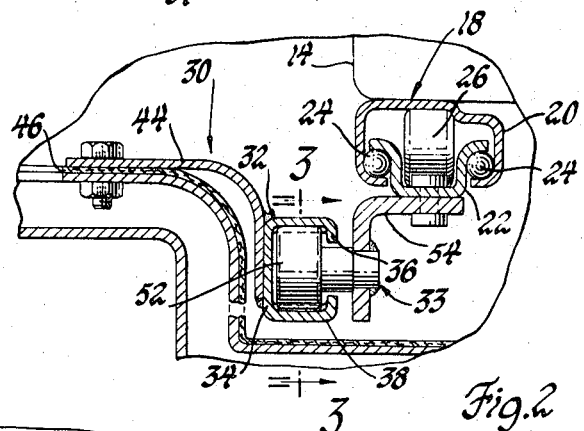
FIG. 2 is an enlarged cross-sectional view taken on line 2—2 of FIG. 1.
Figure 3:
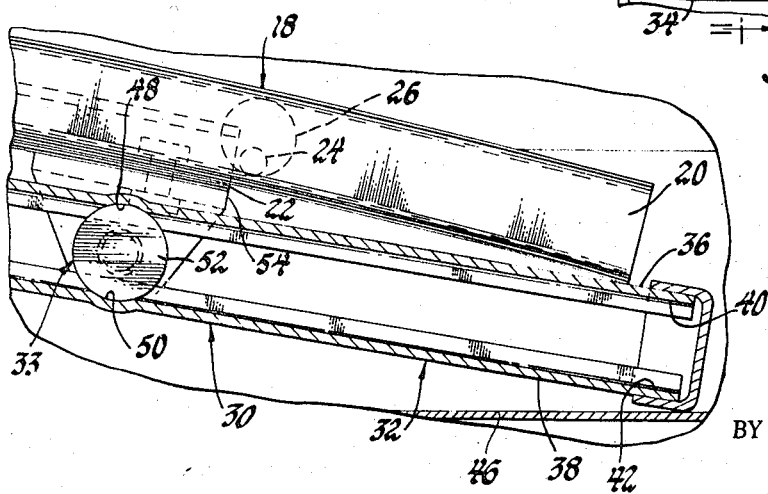
FIG. 3 is a view taken on line 3—3 of FIG. 2.
Figure 4:
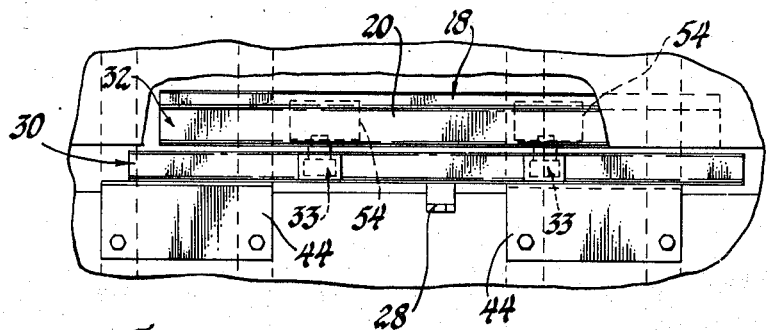
FIG. 4 is a fragmentary plan view taken on line 4—4 of FIG. 1.

As seen in FIGS. 1 and 2, the track assembly 18 has the lower channel member 22 supported by an energy absorbing support assembly 30 made in accordance with the invention. The energy absorbing support assembly 30 includes an elongated longitudinally extending C-shaped channel member 32 and a pair of identically constructed and axially spaced roller assemblies 33. The channel member 32 comprises a substantially vertical base section 34 integrally formed with laterally inwardly extending and vertically spaced arms 36 and 38. The respective arms are provided with opposed bearing surfaces 40 and 42 which lie in parallel and substantially horizontally extending planes. As seen in FIG. 4, each end of the channel member 32 is fixedly attached to a bracket 44 which in turn is bolted to the floor pan 46 of the vehicle. At axially spaced points along the length of the channel member 32 a pair of opposed depressions or wells 48 and 50 are respectively formed in the bearing surfaces 40 and 42 as seen in FIG. 3. Each pair of opposed wells 48 and 50 are adapted to accommodate a roller 52 of one of the roller assemblies 33. The roller 52 is rotatably secured along a transverse axis to an angle iron 54, one arm of which is fixed with the lower channel member 22 of the track assembly. As seen in FIGS. 1 and 4, the spaced rollers 52 are mounted with the track assembly 18 and located in a fixed position relative to the channel member 32 within the aforementioned wells. Thus, under normal conditions, the support assembly 30 restrains the seating unit 10 from movement relative to the floor pan 46, while permitting adjustable fore and aft movement of the seating unit under the control of the track assembly 18.

The seat support assembly described above operates as follows: As alluded to above, under normal conditions, the seating unit 10 can be adjustably positioned relative to the floor pan 46 between a forward and rearward position by merely moving the lever 28 so as to release the associated latching mechanism and permit the upper channel member 20 to ride along the lower channel member 22. Under abnormal conditions, such as when the seat occupant and the seating unit 10 are being subjected to excessive acceleration or deceleration forces, the latching device associated with the track assembly 18 is intended to maintain the channel members 20 and 22 in a locked position. However, as seen in FIG. 1, at such time the energy absorbing support assembly 30 is designed so that the rollers 52 together with the attached seating unit 10 move forwardly or rearwardly depending upon the direction of the inertial forces to the phantom line positions and deform the opposed bearing surfaces 40 and 42 by enlarging the vertical distance between the latter. This result is realized because the diameter of each roller 52 is greater than the normal distance between the bearing surfaces 40 and 42 except in those areas where the roller 52 is located in the wells 48 and 50.

Figure 5:
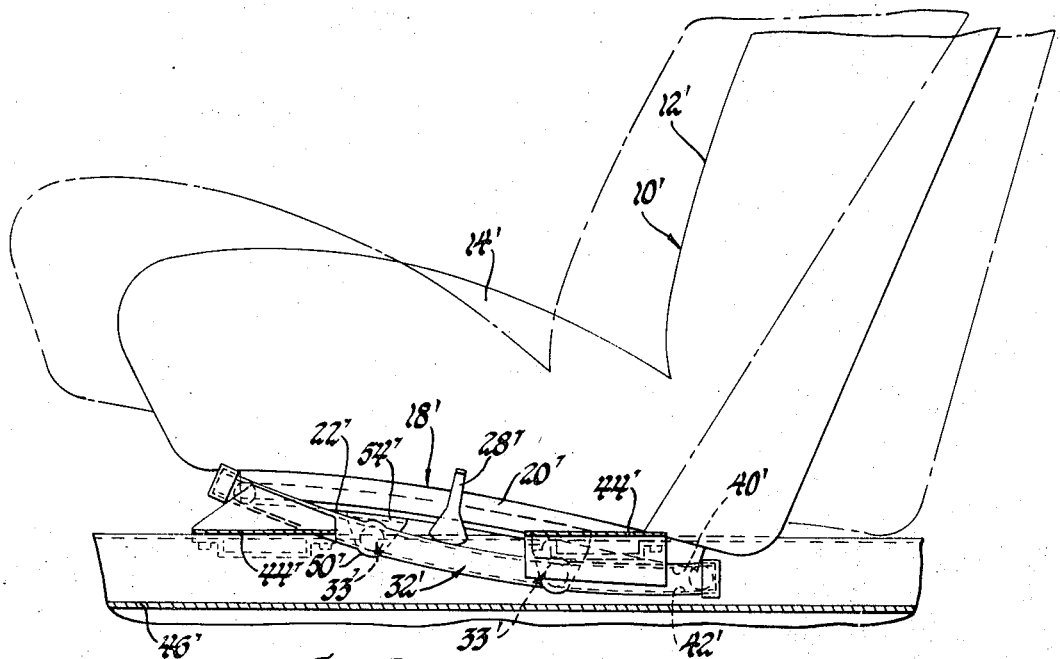
FIG. 5 and 6 show modified forms of the energy absorbing support assembly shown in FIG. 1.
Figure 6:
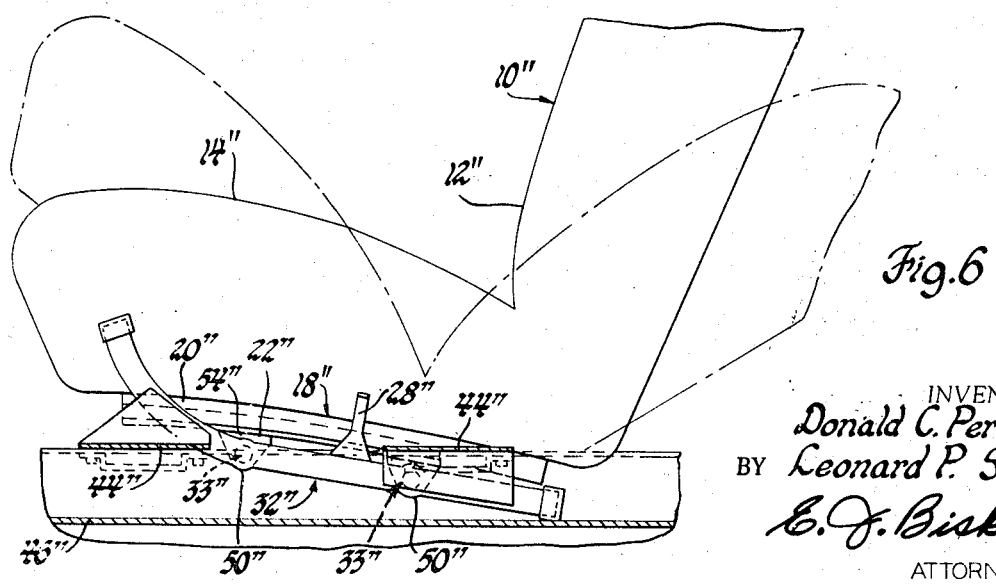

FIGS. 5 and 6 show modifications of the energy absorbing seat support 30 shown in FIGS. 1 through 4. All parts corresponding to those incorporated with the structure shown in the aforementioned figures are identified by the same numerals but primed.

The FIG. 5 arrangement differs from that shown in FIGS. 1 through 4 by having the channel member 32' take an arcuate form so as the rollers 52' move forwardly or rearwardly to deform the bearing surfaces 40' and 42' as aforedescribed, the front or the rear of the seating unit 10' moves to the phantom line positions. The arrangement shown in FIG. 6 is similar except that only the front end of the channel member 32'' is curved and, accordingly, when the inertial forces are acting on the seating unit 10'' in a forward direction, the seating unit 10'' can move to the position indicated by the phantom lines to cradle the seat occupant.

It will be understood that although the energy absorbing seat support assembly in each case is shown operatively associated with a seat adjuster track assembly, the latter device is not required for purposes of realizing the advantages described above. In other words, as seen in FIG. 2, the angle iron 54 can be secured directly to the lower side edge of the seating cushion 14 in which case the seating unit 10 would, in effect, be a stationary seat mounted in the vehicle passenger compartment.

Various changes and modifications can be made in this construction without departing from the spirit of the invention. Such changes and modifications are contemplated by the inventors and they do not wish to be limited except by the scope of the appended claims.

We claim:

1. In combination with a vehicle including a floor and a seating unit, an energy absorbing support assembly for supporting the seating unit on the floor comprising, laterally spaced channel members mounted on the floor and extending longitudinally of the vehicle, the members including spaced generally parallel opposed walls having longitudinally spaced pairs of arcuate depressions, the depressions of each pair opening toward each other in a concentric relationship, and longitudinally spaced rollers mounted on the sides of the seating unit for rotation with respect thereto, the rollers having larger diameters than the distance between the opposed walls, the rollers being received between the opposed walls within the arcuate depressions therein to support the seating unit on the floor against movement, application on the seating unit of an inertial force having a longitudinal component above a predetermined value moving the rollers longitudinally of the members and plastically deforming the walls to increase the distance therebetween substantially to the diameter of the rollers to thereby absorb the longitudinal component of the inertial force above the predetermined value.

References Cited

UNITED STATES PATENTS

| | | | |
|---|---|---|---|
| 2,102,979 | 12/1937 | Smith | 297—216 |
| 2,818,909 | 1/1958 | Burnett | 297—216 |
| 2,942,646 | 6/1960 | Himka | 248—430 |
| 3,022,976 | 2/1962 | Zia | 297—216 |
| 3,427,070 | 2/1969 | Wallach | 297—216 |
| 3,429,613 | 2/1969 | Rice | 297—386 |

FRANCIS K. ZUGEL, Primary Examiner

U.S. Cl. X.R.

248—430